United States Patent [19]

Ariyoshi

[11] Patent Number: 5,174,697
[45] Date of Patent: Dec. 29, 1992

[54] TOOL MOUNT FOR A MACHINING APPARATUS

[75] Inventor: Kiyoko Ariyoshi, Yamaguchi, Japan

[73] Assignees: Kabushikikaisha Otec; Kabushikikaisha Ariyoshi Kikoshudan, both of Japan

[21] Appl. No.: 796,002

[22] Filed: Nov. 22, 1991

[30] Foreign Application Priority Data

Nov. 30, 1990 [JP] Japan .................. 2-336828

[51] Int. Cl.⁵ .......................................... B23B 51/00
[52] U.S. Cl. ............................. 408/239 R; 408/147
[58] Field of Search ............... 408/147, 181, 234, 238, 408/239 R, 231; 279/124, 901

[56] References Cited

U.S. PATENT DOCUMENTS

| 2,564,728 | 8/1951 | Schlitters | 408/181 |
| 3,219,356 | 11/1965 | Wilterdink et al. | 279/124 |
| 3,521,511 | 7/1970 | Peuring et al. | 279/901 |

Primary Examiner—Daniel W. Howell
Attorney, Agent, or Firm—Jones, Tullar & Cooper

[57] ABSTRACT

Disclosed is an improved tool mount for a machining apparatus comprising essentially a tool holder cubic and an adapter to be detachably attached to the tool holder cubic. The tool holder cubic has a center guide projection, a notched cylindrical rod rotatably fitted in a semi-circular hole of the center guide projection, and means for rotating the notched cylindrical rod. The adapter has a center slot to accept the center guide projection of the tool holder cubic, a semicircular recess made so as to allow the notched cylindrical rod to enter when it turns; and means for rotating the notched cylindrical rod to enter the semicircular recess, thereby allowing the adapter and the tool holder cubic to nest together. This arrangement permits easy and quick changing of different tools in a machining apparatus, and automatization of tool exchanging.

1 Claim, 5 Drawing Sheets

TOOL MOUNT FOR A MACHINING APPARATUS

BACKGROUND OF THE INVENTION

1. Field of the Invention

The present invention relates to a tool mount for a machining apparatus.

2. Description of Prior Arts

FIG. 7 shows a representative example of tool mount for a machining apparatus. Specifically, spindle 1 has conical hollow 71 whereas cutting tool assembly E has conical projection 72. Conical projection 72 has grooved end 73. It is inserted in conical hollow 71 of spindle 1, and its grooved end 73 is caught by a collet (not shown). This arrangement has the advantageous effect of facilitating attachment of cutting tool assembly E to spindle 1.

This arrangement, however, requires careful constant checking of conical shape, and the use of a collet makes it difficult to assure the precise rotation of the tool. As for a machining apparatus which is capable of displacing a cutting tool such as a single-point tool C in a radial direction, an associated tool attachment requires that a tool is inserted deep in the spindle, and accordingly the tool slide of the tool attachment will be inevitably bulky.

In the hope of overcoming such disadvantage a contact type tool attachment as shown in FIG. 8 is proposed. It comprises tool slide 7 on the end of spindle 1 of a machining apparatus, and tool C is fixed by its base 74 to tool slide 7 with bolts 75.

This tool mount in which tool C is bolted to tool slide 7 advantageously assures machining precision. However, when tool C is changed, bolts 75 must be unscrewed one after another. This is a tedious work if conducted by hands. Otherwise, if an automatic tool changing system is used, it will be an extremely complicated system, which must be so designed and constructed that bolts 75 are unscrewed; a used tool is changed for a new one; and bolts 75 are screwed to fasten the new tool to tool slide 7. The time involved for the automatic changing work will increase with the number of different tools to be used one after another in machining. In this connection a machining apparatus equipped with such contact type tool attachment can be used in case that a single tool is used all the time or only in selected machining steps in which no frequent tool change is required.

SUMMARY OF THE INVENTION

In view of the above one object of the present invention is to provide an improved contact type tool mount for a machining apparatus which permits tools to be changed quickly with ease.

To attain this object a tool mount for a machining apparatus according to the present invention comprises: holder means which is adapted to be fixed to the spindle of said machining apparatus, said holder means having guide slot means, a notched cylindrical rod, means for rotating said notched cylindrical rod, and a wedge whose width diverges somewhat downwards, inserted in said guide slot means; an adapter to be detachably attached to said holder means, having guide projection means to mate with said guide slot means, a semicircular recess made in said guide projection to allow said notched cylindrical rod to enter when it turns; and means for depressing said wedge to permit attachment of said adapter to said holder means, for rotating said notched cylindrical rod to enter said semicircular recess, thereby putting said adapter and said holder means in prescribed relative position, and for releasing said wedge to integrally connect said adapter and said holder means.

According to one aspect of the present invention a tool mount for a machining apparatus comprises: an integration of tool holder cubic and flat base plate which is adapted to be fixed to the spindle of said machining apparatus, said holder cubic having a center guide projection defined by parallel longitudinal slots on its opposite sides, a notched cylindrical rod rotatably fitted in the hole of said center guide projection, means for rotating said notched cylindrical rod, and a wedge whose width diverges somewhat downwards, said wedge being inserted in one of said slots, and resiliently urged upwards in its fastening position; an adapter to be detachably attached to said tool holder cubic, having a center slot to accept said center guide projection of said tool holder cubic, parallel longitudinal projections on either side of said center slot to slidably fit in said parallel slots of said tool holder cubic, a semicircular recess made in one of said parallel longitudinal projections to allow said notched cylindrical rod to enter when it turns; and means for depressing said wedge towards its unfastening position to permit said adapter to slide in said parallel slots of said tool holder cubic, for rotating said notched cylindrical rod to enter said semicircular recess, thereby allowing said adapter and said tool holder cubic to nest together, and for releasing said wedge to resiliently return to its fastening position in which said adapter and said tool holder cubic are integrally connected.

BRIEF DESCRIPTION OF THE DRAWINGS

Other objects and advantages of the present invention will be understood from a tool mount according to one embodiment of the present invention, which is shown in accompanying drawings.

Figure 1:
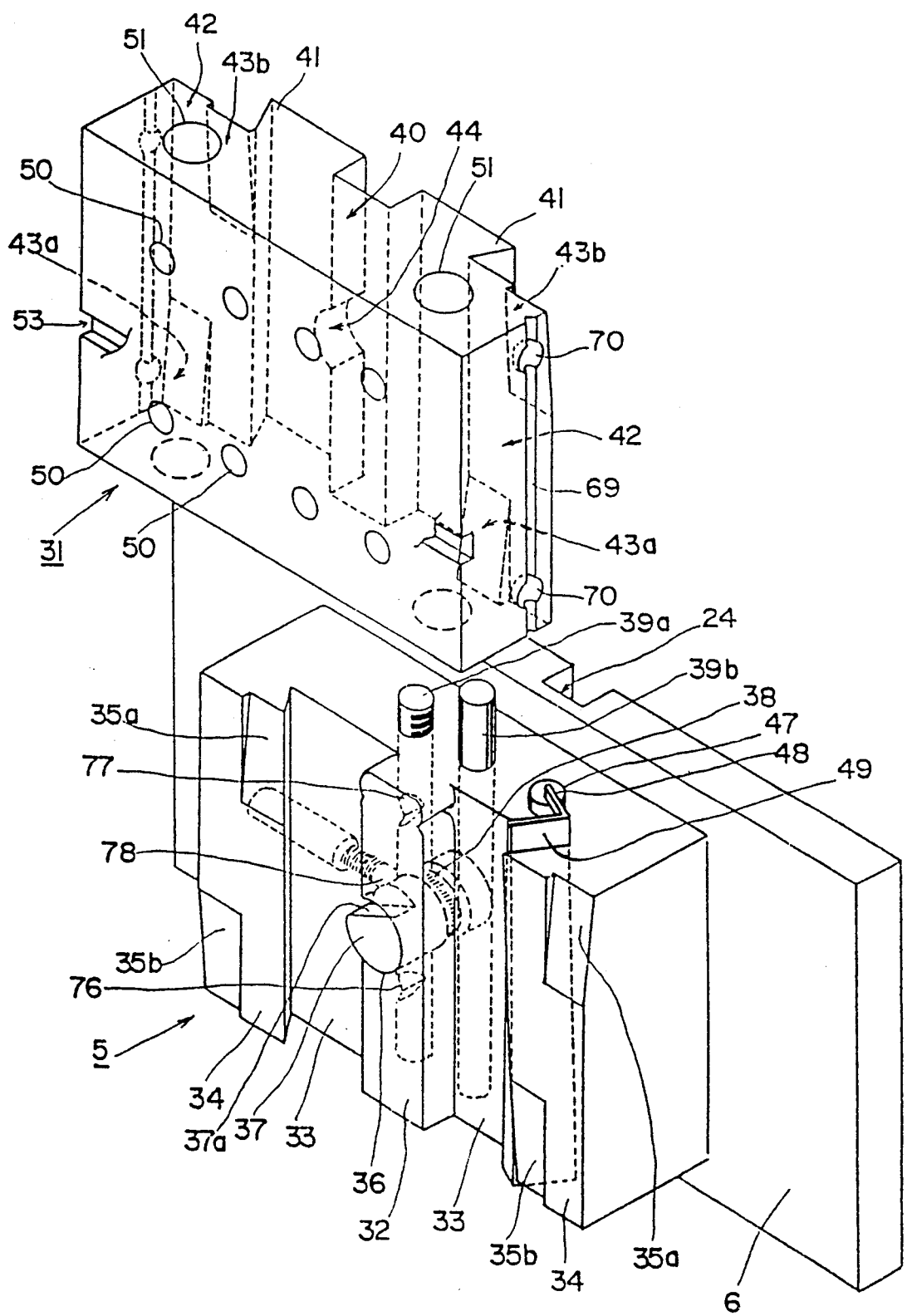
FIG. 1 is a perspective view of the major parts of a tool mount according to the present invention.

Before describing the structure of a tool mount according to the present invention the structure of a tool slide which is adapted to carry the tool mount for traversing an associated cutting tool across the end of the spindle of a machining apparatus is described with reference to FIGS. 4 and 5. As shown, rotary disk 2 is fixed to the end of hollow cylindrical spindle 1 perpendicular thereto. A pair of parallel holder rods ( not shown ) are provided on the front of rotary disk 2.

Traverse slide 7 consists of an integration of tool holder cubic 5 and flat base plate 6, and traverse slide 7 is slidably fitted in between the parallel rods. Push plates 3, 3 are applied to the parallel rods to permit slide 7 to traverse freely on rotary disk 2.

Tool drive shaft 10 is in inner space 9 of spindle 1. Drive means for driving spindle 1 and tool drive shaft 10 are equipped with transmission to permit spindle 1 and tool drive shaft 10 to rotate normally at same speed in same direction, and to permit tool drive shaft 10 to rotate at speed which is different from the rotating speed of spindle 1 only when traverse slide 7 is desired to traverse.

Figures 2, 3:
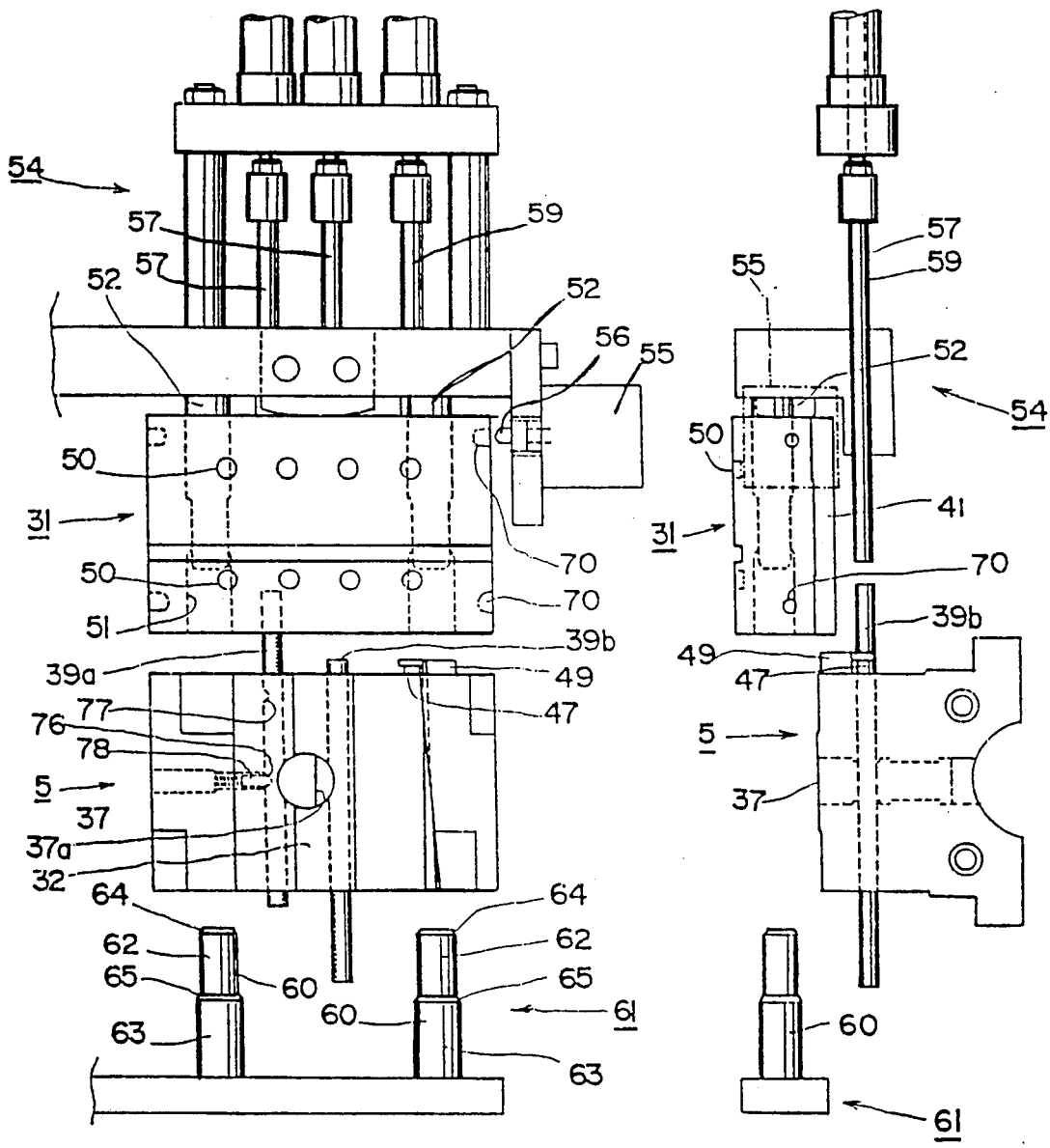
FIG. 2 is a front view of the tool mount.
FIG. 3 is a side view of the tool mount.

Female nut 11 is fixed to the rear surface of traverse slide 7 as seen leftwards in FIGS. 1 and 2, and male bolt 12 is inserted in female nut 11. Male bolt 12 has frustom gear wheel 13 integrally connected to the intermediate portion thereof. Likewise, tool drive shaft 10 has frustom gear wheel 14 integrally connected to the end thereof. Frustom gear wheel 13 is mated with frustom gear wheel 14. Rotary disk 2 is provided with two parallel rods 4, 4, which pass through traverse slide 7. Each parallel rod has spring means (not shown) to urge traverse slide 7 rightwards in the drawings all the time.

With this arrangement rotation of tool drive shaft 10 causes frustom gear wheels 13 and 14 to rotate male bolt 12, thereby traversing female nut 11 and hence traverse slide 7.

Each of a pair of primary balancers A comprises weight 16 and shank 15 integrally connected thereto. Each primary balancer A is rotatably fixed to disk 2 about the intermediate point of shank 5 by pin 15a. Traverse slide 7 has longitudinal slot 24 made centrally in its rear surface. The end of each shank 15 is slidably fitted in longitudinal slot 24 by inserting square head 25 of square-headed pin 17 therein. As seen from FIG. 5, rotary disk 2 is enclosed in casing 8 to prevent invasion of foreign substances.

Each of a pair of secondary balancers B comprises two sector weight 19. Annular flange 23 is integrally connected to the circumference of rotary disk 2 to extend radially inside. Two sector weights 19 sandwich annular flange 23, and the lower sides of sector weights 19 are connected by the shafts of two rolls 21. Front sector weight 19 has "V"-shaped groove 22, which is composed of two circular arcs combined generally in the form of the letter "V". One secondary balancer thus provided, can travel freely along the inner circular edge of frange 23 with the aid of its rolls 21. Similarly, another secondary balancer B is provided. Weight 16 of each primary balancer A has guide pins 18 on its opposite ends. Each secondary balancer B is connected to associated primary balancer A with one or both of guide pins 18 of weight 16 in "V"-shaped groove 22 of sector weight 19.

Figure 4:
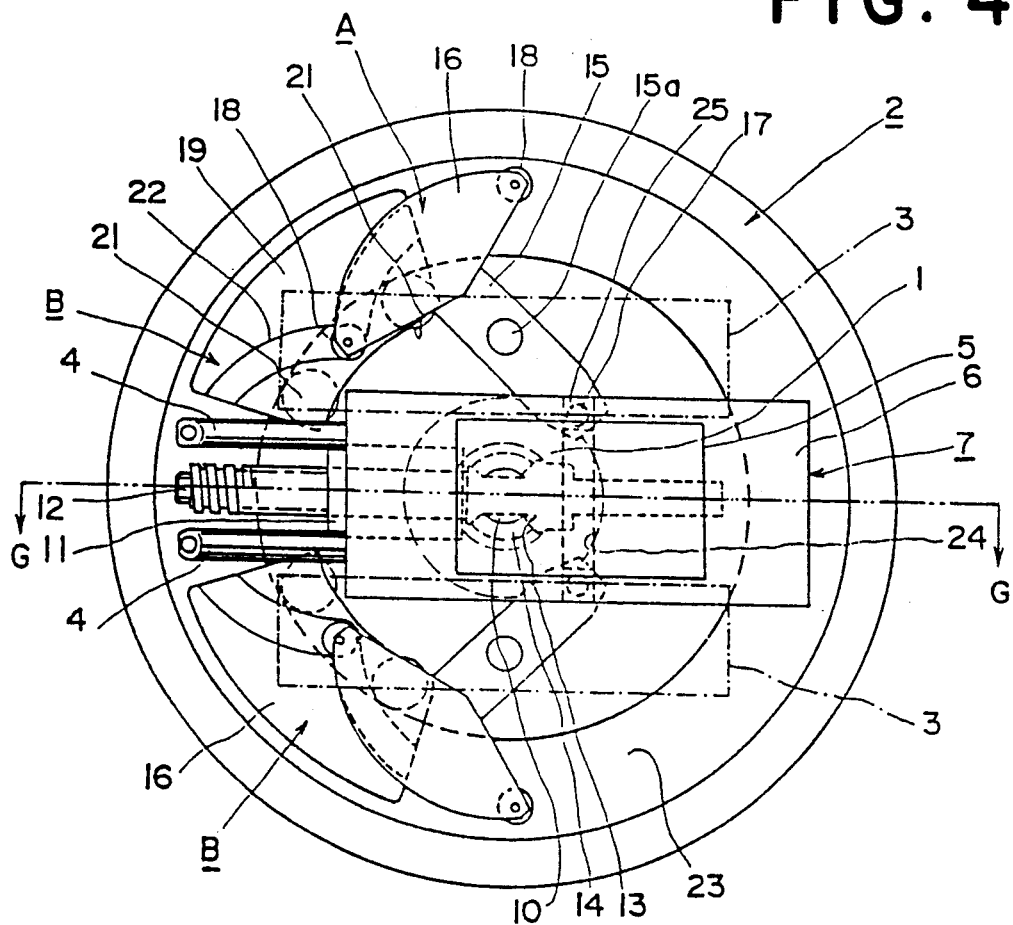
FIG. 4 is a front view of the rotary disk of a machining apparatus which is to be equipped with a tool mount according to the present invention.
Figure 5:
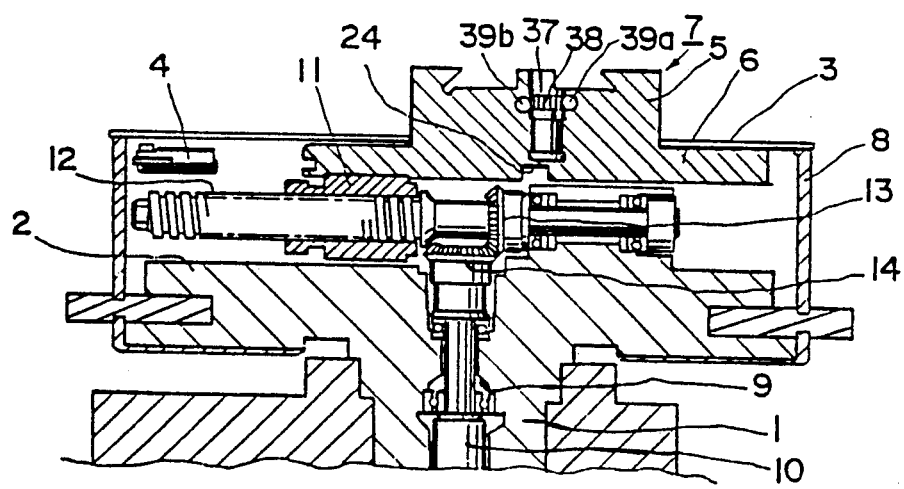
FIG. 5 is a sectional view of the rotary disk of the machining apparatus taken along the line G-G in FIG. 4.

As seen from FIG. 4, the rightward shift of traverse slide 7 causes primary balancers A to rotate and come closer to each other, and secondary balancers B to travel along frange 23 and come closer to each other through the agency of cam mechanism, which is consisted of guide pins 18 of weight 16 and "V"-shaped groove 22. Thus, primary and secondary balancers A and B are generally displaced in the direction i.e. leftwards ) which is opposite to traverse slide 7 until the equilibrium is maintained in rotary disk 2. No matter what position traverse slide 7 carrying cutting tool C is brought across rotary disk 2, rotary disk 2 may be guaranteed free of imbalance, thus permitting rotary disk 2 to rotate with a high precision.

Now, the structure of the tool mount is described.

As shown in FIG. 1, the front of tool holder cubic 5 has center guide projection 32 and opposite side guide projections 34. Parallel slots 33 are defined between center and side guide projections 32 and 34. The top surface of each side guide projection 34 has two slant sections 35a and 35b at its diagonally opposite corners, thus leaving a staggered-rectangular section on its top surface.

Center guide projection 32 has notched cylindrical rod 37 rotatably fitted in hole 36. Notched cylindrical rod 37 has vertical flat plane 37a and toothed circumference 38 in the form of pinion. This pinion 38 is mated with parallel racks 39a and 39b, which are slidably fitted in through holes made in tool holder cubic 5. Rack 39a has two notches 76 and 77 made on its rear side, and these notches 76 and 77 are adapted to accept spring-biased catch bolt 78 when rack 39a is lowered or raised to predetermined vertical positions in which notched cylindrical rod 37 is rotated to have its vertical flat plane 37a flush with the side of center guide projection 32 or its round circumference projecting from the side of center guide projection 32.

Steel wedge 49 whose width diverges somewhat downwards is inserted in slot 33 until its "L"-shaped top 48 is caught by push rod 47, which is resiliently urged upwards to appear from the top side of tool holder cubic 5.

As for adapter 31 to be attached to tool holder cubic 5 it has a center slot 40 to accept center guide projection 32 of tool holder cubic 5, "V"-shaped projections 41 adapted to fit in parallel slots 33 of tool holder cubic 5 and two staggered-rectangular sections 42 adapted to fit on the corresponding staggered-rectangular sections of opposite side guide projections 34 of tool holder cubic 5. Each staggered-rectangular section 42 has slant sections 43a and 43b at its diagonally opposite corners. Semicircular recess 44 is made in left "V"-shaped projection 40 to allow notched cylindrical rod 37 to enter when it turns Adapter 31 has two longitudinal through holes 51, and the front of adapter 31 has a plurality of holes to receive an associated cutting tool and two lateral slots 53 to orientate the cutting tool in a prescribed direction. The cutting tool has two counter projections (not shown) on its bottom to fit in lateral slots 53. Also, adapter 31 has a longitudinal groove 69 and two holes 70 on either side.

As shown in FIGS. 2 and 3, application unit 54 which is adapted to carry adapter 31 with cutting tool C fixed thereto and apply adapted 31 to tool holder cubic 5, comprises upper lateral arm, two longitudinal support rods 52, 52 fixed to and suspending from upper lateral arm, electromagnet 55 fixed to one side of lateral arm in the vicinity of one of longitudinal support rods 52, 52 for preventing adapter 31 from descending along longitudinal support rods 52, 52 with the aid of its movable projection 56, three hydraulic cylinders 57, 57, and 59 fixed to upper lateral arm for driving racks 39a and 39b and for pushing wedge 49 of tool holder cubic 5 respectively. Withdrawal unit 61 comprises lower lateral arm 61 having two support rods 60, 60 erecting thereon.

Support rods 52 and 60 have a same configuration. Support rod 60 has trunk portion 63 of relatively large diameter and head portion 62 of relatively small diameter. Head portion 62 has chamferred circumference 64 on its top, and upward-converging trangent circumference 65 is provided between trunk portion 63 and head portion 62. Likewise, each through hole 51 of adapter 31 has a corresponding hollow shape. Specifically it comprises upper and lower hollow entrances of relatively large diameter and intermediate hollow space of relatively small diameter, and these sections of different diamters communicate with each other via converging or diverging transient sections. This assures that support rods 52 and 60 are smoothly inserted in corresponding throughholes 51 all the way from entrance to final position without any interference which might cause deformation in support rods 52 and 60 or throughholes 51.

The manner in which adapter 31 with cutting tool C fixed thereto is nested with tool holder cubic 5 is described below with reference to FIG. 2. First, adapter 31 is attached to upper lateral arm assembly 54 by inserting its support rods 52 in through holes 51 of adapter 31, and then, electromagnet 55 is actuated to project its movable projection 56, thereby abutting upon adapter 31 to prevent adapter 31 from descending along longitudinal support rods 52, 52. Then, lateral arm assembly 54 carries adapter 31 to tool holder cubic 5.

Thereafter, hydraulic cylinder 59 is actuated to push "L"-shaped top 48 of steel wedge 49, thus loosening wedge 49, and at the same time left hydraulic cylinder 57 is actuated to push rack 39a down, thus rotating notched cylindrical rod 37 until its vertical flat plane 37a is flush with the side of center guide projection 32. Then, spring-biased catch bolt 78 is allowed to advance and fit in notch 77 on the rear side of rack 39a, thus holding rack 39a in first predetermined position in which notched cylindrical rod 37 is prevented from rotating, and is kept with its vertical flat plane 37a flush with the side of center guide projection 32. The other rack 39b rises as a counter action to the pushing-down of rack 39a.

Now, adapter 31 is allowed to fit and descend on the surface of tool holder cubic 5, and consequently adapter 31 is nested with tool holder cubic 5 with "V"-shaped projections 41 inserted in parallel slots 33.

When adapter 31 starts descending on tool holder cubic 5, each slant section 43a of adapter 31 rides on the staggered-rectangular surface 34 of each side wall of tool holder cubic 5 to assist adapter 31 in aligning with tool holder cubic 5 so that "V"-shaped projections 41 may be fitted exactly in parallel slots 33 of tool holder cubic 5. Then, right hydraulic cylinder 57 is actuated to push rack 39b down, thereby rotating pinion 38 until notched cylindrical rod 37 is fitted in semicircular recess 44 of "V"-shaped projection 41, thereby permitting adapter 31 to be mated with tool holder cubic 5. At the same time, rack 39a is raised until spring-biased catch bolt 78 is allowed to advance and fit in notch 76, thereby keeping rack 39a at second predetermined position, preventing notched cylindrical rod 37 from turning. Finally, hydraulic cylinder 59 is released to remove pressure from wedge 49, thereby allowing it to resiliently rise from depression under influence of spring 48, thus integrally connecting adapter 31 to tool holder cubic 5.

Electromagnetic unit 55 withdraws its projection 56, thereby setting adapter 31 free from upper lateral arm 54, and then upper lateral arm assembly 54 is raised and displaced to a place where it causes no interference to the machining work, which will be effected by rotating spindle 1 with traverse slide 7 carrying a cutting tool on its tool holder cubic 5.

When removing the cutting tool after finishing the cutting work, left hydraulic cylinder 57 is actuated to push rack 39a down, therby rotating pinion 37 until vertical flat plane 37a of notched cylindrical rod 37 is flush with the side of center guide projection 32. At the same time, hydraulic cylinder 59 is actuated to push wedge 49 down, thereby disconnecting adapter 31 from tool holder cubic 5.

Figure 6:
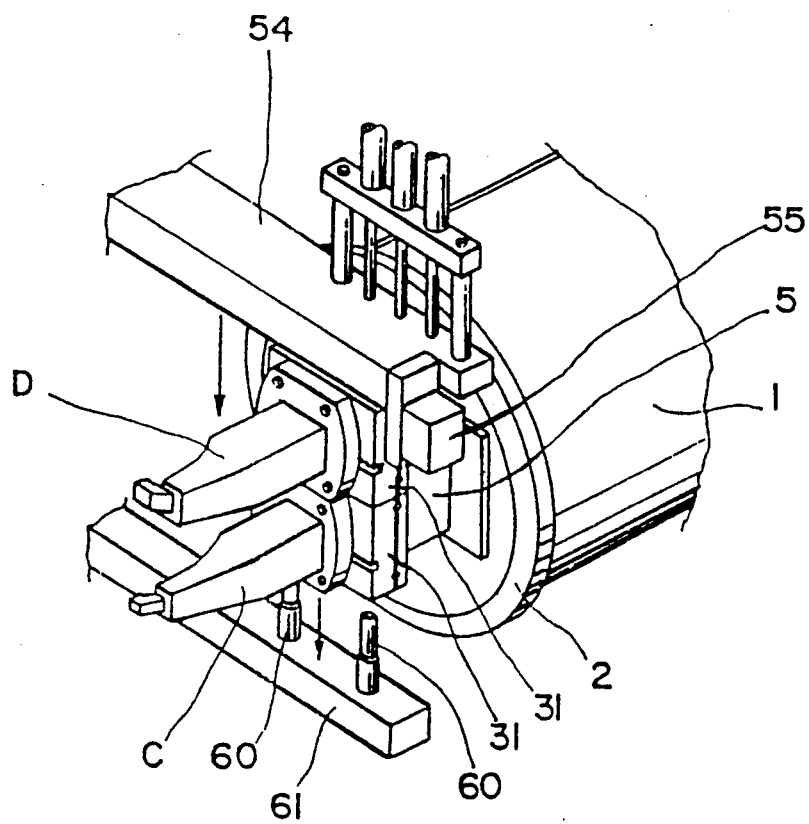
FIG. 6 is a perspective view of the tool mount fixed to the spindle of the machining apparatus, showing the manner in which a used tool is being changed for a new one.
Figure 7:
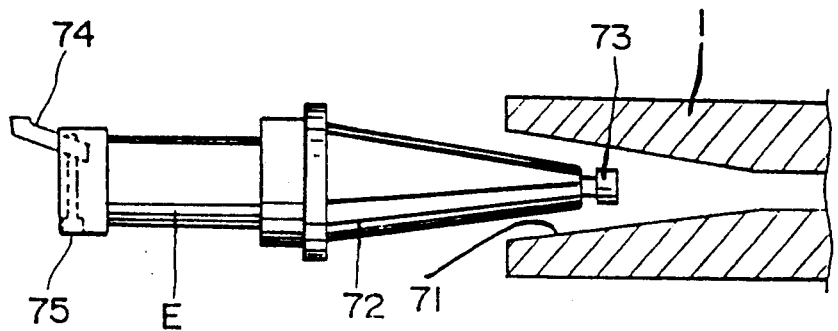
FIG. 7 shows schematically a conventional tapering type tool mount.
Figure 8:
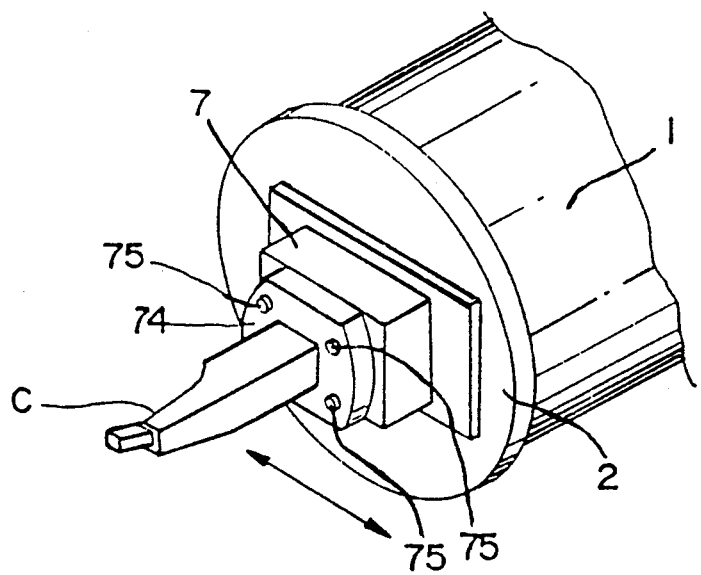
FIG. 8 shows schematically a conventional contact type tool mount. Description of Preferred Embodiments.

Adapter 31 with the cutting tool mounted thereon can start descending towards lower lateral arm 61 by gravity. Otherwise, it may be so designed and constructed that adapter 31 with cutting tool C mounted thereon can start descending towards lower lateral arm 61 when following adapter 31 with another cutting tool D mounted thereon abuts on preceding adpter 31 to continue the pushing-down of preceding adapter 31, as seen from FIG. 6. With this arrangement one round trip of upper and lower lateral arm assemblies 54 and 61 between tool store and spindle 1 suffices in changing cutting tools, and advantageously different cutting tools can be changed smoothly in a relatively short time.

The tool mounting mechanism which is designed to attach a desired cutting tool to the spindle of a machining apparatus is described above. However, it should be understood that a similar structure can be advantageously applied to a work pallet to which a work piece is attached.

As may be understood from the above, an improved contact type tool attachment according to the present invention permits easy and quick changing of different tools in a machining apparatus, and it is very useful in automatization of tool exchanging.

What is claimed is:

1. A tool mount for a machining apparatus comprising: an integration of tool holder cubic and flat base plate which is adapted to be fixed to the spindle of said machining apparatus, said holder cubic having a center guide projection defined by parallel longitudinal slots on its opposite sides, a notched cylindrical rod rotatably fitted in the hole of said center guide projection, means for rotating said notched cylindrical rod, and a wedge whose width diverges somewhat downwards, said wedge being inserted in one of said slots, and resiliently urged upwards in its fastening position; an adapter to be detachably attached to said tool holder cubic, having a center slot to accept said center guide projection of said tool holder cubic, parallel longitudinal projections on either side of said center slot to slidably fit in said parallel slots of said tool holder cubic, a semicircular recess made in one of said parallel longitudinal projections to allow said notched cylindrical rod to enter when it turns; and means for depressing said wedge towards its unfastening position to permit said adapter to slide in said parallel slots of said tool holder cubic, for rotating said notched cylindrical rod to enter said semicircular recess, thereby allowing said adapter and said tool holder cubic to nest together, and for releasing said wedge to resiliently return to its fastening position in which said adapter and said tool holder cubic are integrally connected.

* * * * *